US012387534B2

(12) United States Patent
Moshchuk et al.

(10) Patent No.: US 12,387,534 B2
(45) Date of Patent: Aug. 12, 2025

(54) DRIVERLESS TESTING SYSTEM FOR A VEHICLE

(71) Applicant: GM Global Technology Operations LLC, Detroit, MI (US)

(72) Inventors: Nikolai K. Moshchuk, Grosse Pointe Farms, MI (US); Jason D. Ritter, Whitmore Lake, MI (US); Kelli Mandeville, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/326,182

(22) Filed: May 31, 2023

(65) Prior Publication Data

US 2024/0404327 A1 Dec. 5, 2024

(51) Int. Cl.
*G07C 5/00* (2006.01)
*G07C 5/02* (2006.01)

(52) U.S. Cl.
CPC ............... *G07C 5/008* (2013.01); *G07C 5/02* (2013.01)

(58) Field of Classification Search
CPC ........ G07C 5/008; G07C 5/02; G07C 5/0808; G05B 23/0213; G05B 2219/24065; G01M 17/007
USPC .............................................................. 701/2
See application file for complete search history.

(56) References Cited

U.S. PATENT DOCUMENTS

| | | | | |
|---|---|---|---|---|
| 2016/0288687 | A1* | 10/2016 | Scherle | B66F 9/063 |
| 2016/0299229 | A1* | 10/2016 | Heinonen | G01S 17/86 |
| 2018/0196427 | A1* | 7/2018 | Majumdar | G05D 1/0061 |
| 2021/0146889 | A1* | 5/2021 | Kuehne | G05D 1/0225 |
| 2021/0272389 | A1* | 9/2021 | Prenger | H04W 4/48 |
| 2022/0365530 | A1* | 11/2022 | Foster | B60W 60/0015 |
| 2024/0059323 | A1* | 2/2024 | Gerrese | H04W 4/023 |
| 2024/0404327 | A1* | 12/2024 | Moshchuk | G07C 5/02 |

* cited by examiner

*Primary Examiner* — Tyler D Paige
(74) *Attorney, Agent, or Firm* — Vivacqua Crane, PLLC

(57) ABSTRACT

A driverless testing system for a vehicle driven along a predefined route situated in a location remote from a ground station control station includes one or more ground station controllers located at the ground station control station that are in wireless communication with a plurality of actuators, one or more field sensors, and a plurality of vehicle instrumentation sensors by a network. The one or more ground station controllers execute instructions to instruct the plurality of actuators drive the vehicle along the predefined route based on a vehicle test pattern and monitor the plurality of vehicle instrumentation sensors for a plurality of operating parameters of the vehicle. In response to detecting one or more of the operating parameters of the vehicle are compromised, the one or more ground station controllers select an alternative state of operation of the vehicle.

20 Claims, 3 Drawing Sheets

DRIVERLESS TESTING SYSTEM FOR A VEHICLE

INTRODUCTION

The present disclosure relates to a driverless testing system for a vehicle driven along a predefined route, where the predefined route is in a location remote from a ground station control station.

Vehicles may undergo different types of testing to verify compliance with various standards and regulations, as well as to evaluate the systems and subsystems that are part of a vehicle. For example, a vehicle may be driven along a test track by a driver to evaluate features such as, but not limited to, vehicle dynamics, comfort, and durability. However, some types of tests conducted at a test track are labor intensive and take a considerable amount of time to complete. As an example, some types of durability tests for a vehicle may take weeks or months to complete, which may induce physical and mental fatigue for drivers.

Thus, while various approaches for testing vehicles achieve their intended purpose, there is a need in the art for an improved approach for testing vehicles that are driven along a test track that reduces physical and mental fatigue for drivers.

SUMMARY

According to several aspects, a driverless testing system for a vehicle driven along a predefined route situated in a location remote from a ground station control station is disclosed. The driverless testing system includes one or more ground station controllers located at the ground station control station that are in wireless communication with a plurality of actuators and a plurality of vehicle instrumentation sensors by a network. The plurality of vehicle instrumentation sensors are installed within the vehicle and the plurality of actuators are installed within and control motion of the vehicle. The one or more ground station controllers execute instructions to instruct the plurality of actuators drive the vehicle along the predefined route based on a vehicle test pattern. The one or more ground station controllers monitor the plurality of vehicle instrumentation sensors for a plurality of operating parameters of the vehicle. In response to detecting one or more of the operating parameters of the vehicle are compromised, one or more ground station controllers select an alternative state of operation of the vehicle based on a severity of the plurality of operating parameters that are compromised.

In another aspect, the one or more ground station controllers select a first alternative state of operation that allows the vehicle to complete a current segment of the vehicle test pattern that the vehicle is currently performing first before coming to a stop.

In yet another aspect, the one or more ground station controllers select the first alternative state of operation in response to detecting at least one of the following: a lateral path tracking error exceeds a first lateral threshold value, a velocity tracking error exceeds a first velocity threshold value, an intermittent loss of wireless communication between the one or more ground station controllers and the vehicle lasting a first duration of time, and when one or more of the vehicle instrumentation sensors are non-operational but a confidence level of data collected by the plurality of vehicle instrumentation sensors is maintained.

In an aspect, the one or more ground station controllers select a second alternative state of operation that instructs the vehicle to pull over to a shoulder of a roadway of the predefined route.

In another aspect, the one or more ground station controllers select the second alternative state of operation in response to detecting at least one of the following: a lateral path tracking error exceeds a second lateral threshold value, a velocity tracking error exceeds a second velocity threshold value, an intermittent loss of wireless communication between the one or more ground station controllers and the vehicle lasting a second duration of time, a vehicle diagnostic signal indicating the vehicle is to stop at the earliest possibility, a signal from one or more of the actuators indicating the vehicle is to stop at the earliest possibility, and when one or more of the vehicle instrumentation sensors are non-operational but a minimum number of vehicle instrumentation sensors is maintained.

In yet another aspect, the one or more ground station controllers select a third alternative state of operation that instructs the vehicle to perform an emergency stop within a current lane of travel.

In an aspect, the one or more ground station controllers select the third alternative state of operation in response to detecting at least one of the following: a lateral path tracking error exceeds a third lateral threshold value, a velocity tracking error exceeds a third velocity threshold value, an intermittent loss of wireless communication between the one or more ground station controllers and the vehicle lasting a third duration of time, a vehicle diagnostic signal indicating the vehicle is to stop immediately, a signal from one or more of the actuators 24 indicating the vehicle is to stop immediately, and when more than one vehicle instrumentation sensor is non-operational and localization of the vehicle is not possible.

In another aspect, further comprising: one or more field sensors in wireless communication with the one or more ground station controllers, where the one or more field sensors are installed along the predefined route in positions that allow each field sensor to detect a position of the vehicle relative to the predefined route.

In yet another aspect, the one or more ground station controllers select the third alternative state of operation in response to detecting one or more of the field sensors indicating the vehicle has left a geofenced area containing the predefined route.

In an aspect, the one or more ground station controllers select a fourth alternative state of travel that instructs the vehicle to perform a task change to address one or more vehicle components that are experiencing abnormalities.

In another aspect, the one or more ground station controllers select the fourth alternative state of operation in response to detecting at least one of the following: brakes or shocks of the vehicle exceed a threshold operating temperature, a tire pressure falls outside a standard operating range, and a load experienced by steering components or chassis components that are part of the vehicle exceed a predefined threshold load value.

In yet another aspect, the plurality of operating parameters includes one or more of the following: a lateral path tracking error of the vehicle, a velocity tracking error of the vehicle, a brake temperature, a shock temperature, and a load experienced by one or more chassis components.

In an aspect, the one or more ground station controllers select one of the following: a first state of operation that allows the vehicle to complete a current segment of the vehicle test pattern that the vehicle is currently performing first before coming to a stop, a second alternative state of operation that instructs the vehicle to pull over to a shoulder of a roadway of the predefined route, a third alternative state of operation that instructs the vehicle to perform an emergency stop within a current lane of travel, or a fourth alternative state of travel that instructs the vehicle to perform a task change to address one or more vehicle components that are experiencing abnormalities.

In another aspect, a method of testing a vehicle by driverless testing system, wherein the vehicle is driven along a predefined route situated in a location remote from a ground station control station. The method includes instructing, by one or more ground station controllers located at the ground station control station, a plurality of actuators drive the vehicle along the predefined route based on a vehicle test pattern, where the plurality of actuators are installed within and control motion of the vehicle. The method includes monitoring, by the one or more ground station controllers, a plurality of vehicle instrumentation sensors for a plurality of operating parameters of the vehicle. In response to detecting one or more of the plurality of operating parameters of the vehicle are compromised, the method includes selecting, by the one or more ground station controllers, an alternative state of operation of the vehicle, where the alternative state of operation is selected based on a severity of the plurality of operating parameters that are compromised.

In an aspect, a driverless testing system for a vehicle driven along a predefined route situated in a location remote from a ground station control station. The driverless testing system includes one or more ground station controllers located at the ground station control station. The one or more ground station controllers are in wireless communication with a plurality of actuators and a plurality of vehicle instrumentation sensors by a network, and the plurality of vehicle instrumentation sensors are installed within the vehicle and the plurality of actuators are installed within and control motion of the vehicle. The one or more ground station controllers execute instructions to instruct the plurality of actuators drive the vehicle along the predefined route based on a vehicle test pattern. The one or more ground station controllers monitor the plurality of vehicle instrumentation sensors for a plurality of operating parameters of the vehicle. In response to detecting one or more of the operating parameters of the vehicle are compromised, the one or more ground station controllers select an alternative state of operation of the vehicle based on a severity of the plurality of operating parameters that are compromised, where a first alternative state of operation allows the vehicle to complete a current segment of the vehicle test pattern that the vehicle is currently performing first before coming to a stop, a second alternative state of operation instructs the vehicle to pull over to a shoulder of a roadway of the predefined route, a third alternative state of operation instructs the vehicle to perform an emergency stop within a current lane of travel, and a fourth alternative state of travel instructs the vehicle to perform a task change to address one or more vehicle components that are experiencing abnormalities.

In another aspect, the one or more ground station controllers select the first alternative state of operation in response to detecting at least one of the following: a lateral path tracking error exceeds a first lateral threshold value, a velocity tracking error exceeds a first velocity threshold value, an intermittent loss of wireless communication between the one or more ground station controllers and the vehicle lasting a first duration of time, and when one or more of the vehicle instrumentation sensors are non-operational but a confidence level of data collected by the plurality of vehicle instrumentation sensors is maintained.

In yet another aspect, the one or more ground station controllers select the second alternative state of operation in response to detecting at least one of the following: a lateral path tracking error exceeds a second lateral threshold value, a velocity tracking error exceeds a second velocity threshold value, an intermittent loss of wireless communication between the one or more ground station controllers and the vehicle lasting a second duration of time, a vehicle diagnostic signal indicating the vehicle is to stop at the earliest possibility, a signal from one or more of the actuators indicating the vehicle is to stop at the earliest possibility, and when one or more of the vehicle instrumentation sensors are non-operational but a minimum number of vehicle instrumentation sensors is maintained.

In an aspect, the one or more ground station controllers select the third alternative state of operation in response to detecting at least one of the following: a lateral path tracking error exceeds a third lateral threshold value, a velocity tracking error exceeds a third velocity threshold value, an intermittent loss of wireless communication between the one or more ground station controllers and the vehicle lasting a third duration of time, a vehicle diagnostic signal indicating the vehicle is to stop immediately, a signal from one or more of the actuators 24 indicating the vehicle is to stop immediately, and when more than one vehicle instrumentation sensor is non-operational and localization of the vehicle is not possible.

In another aspect, the one or more ground station controllers select the fourth alternative state of operation in response to detecting at least one of the following: brakes or shocks of the vehicle exceed a threshold operating temperature, a tire pressure falls outside a standard operating range, and a load experienced by steering components or chassis components that are part of the vehicle exceed a predefined threshold load value.

In yet another aspect, the plurality of operating parameters includes one or more of the following: a lateral path tracking error of the vehicle, a velocity tracking error of the vehicle, a brake temperature, a shock temperature, and a load experienced by one or more chassis components.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
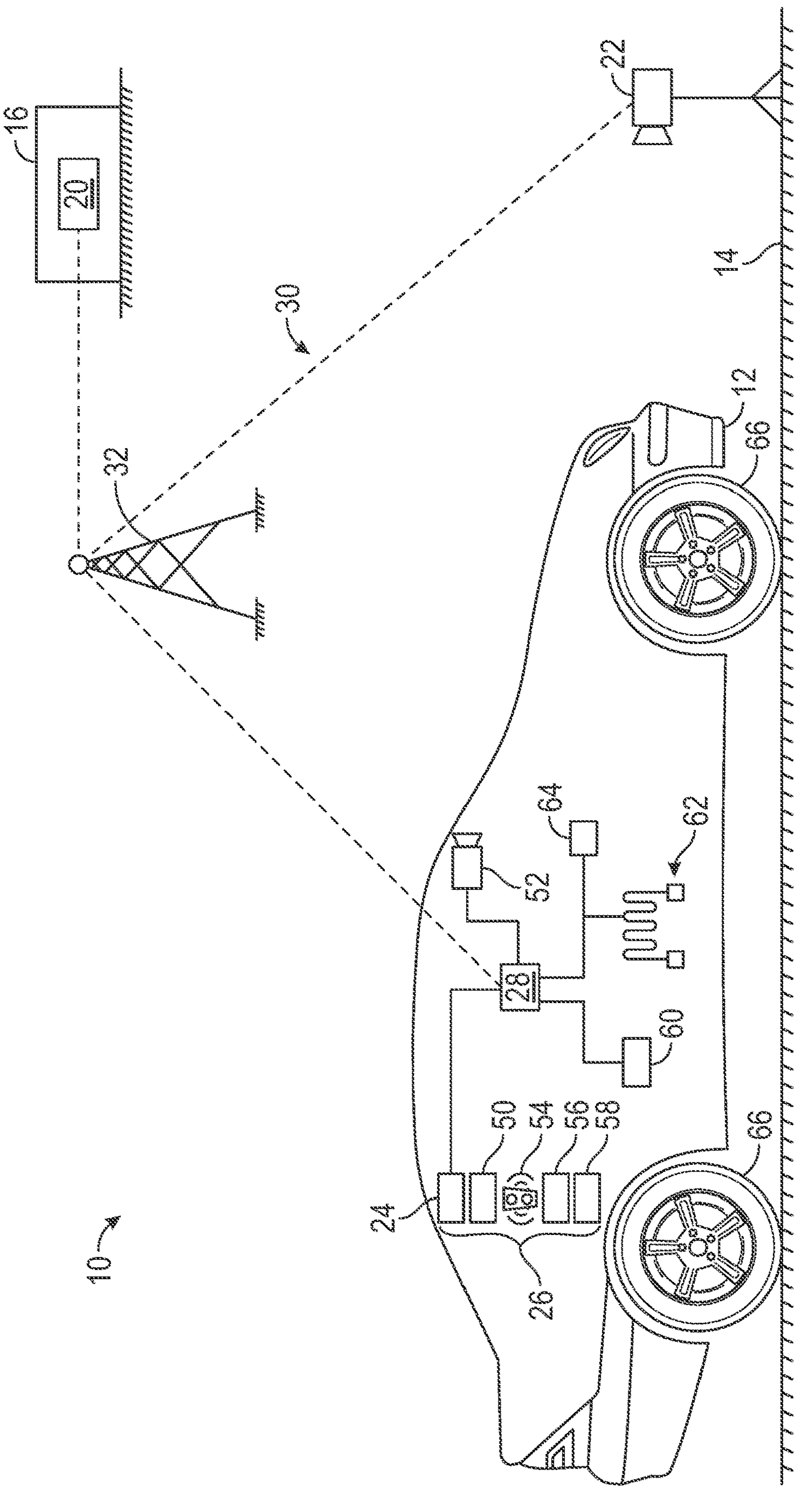
FIG. 1 is a schematic diagram of the disclosed driverless testing system including a one or more ground station controllers in wireless communication with field sensors and a vehicle that is driven along a predefined route, according to an exemplary embodiment.

Referring to FIG. 1, a driverless testing system 10 for a vehicle 12 is illustrated. It is to be appreciated that the vehicle 12 may be any type of vehicle such as, but not limited to, a sedan, truck, sport utility vehicle, van, or motor home. In an embodiment, the vehicle 12 includes an automated driving system (ADS) or an advanced driver assistance system (ADAS) for assisting a driver with steering, braking, and/or accelerating. However, in an alternative embodiment, the vehicle 12 is manually driven vehicle that is operated by a user instead. The vehicle 12 is driven along a predefined route 14 in a location that is remote from a ground station control station 16. The predefined route 14 represents a roadway including a predefined course located within a geofenced area that the vehicle 12 travels along while completing a vehicle test pattern. In one non-limiting embodiment, the predefined route 14 is part of a dedicated roadway such as, for example, a test track. However, it is to be appreciated that the predefined route 14 may include public roads as well. In one non-limiting embodiment, the predefined route 14 is a test track located at a proving grounds facility for testing vehicles and the vehicle test pattern is a durability test schedule. However, the vehicle 12 is not limited to performing durability testing and the vehicle test pattern may include other types of vehicle tests as well such as, for example, handling testing, dynamics testing, ride testing, brake testing, road load data acquisition (RLDA) testing, and high-speed testing. The ground station control station 16 represents a back-end office, where one or more operators may monitor the vehicle 12 as the vehicle 12 completes the vehicle test pattern and intervene when necessary.

The driverless testing system 10 includes one or more ground station controllers 20 located at the ground station control station 16, one or more field sensors 22 located along the predefined route 14, a plurality of actuators 24 located within the vehicle 12, and a plurality of vehicle instrumentation sensors 26 that are installed on the vehicle 12. The one or more ground station controllers 20 are in wireless communication with the one or more field sensors 22, the plurality of actuators 24, and the plurality of vehicle instrumentation sensors 26 by a network 30 that is based on any type of wireless communication protocol. The network 30 may include one or more base stations 32 that connect the one or more ground station controllers 20 to the one or more field sensors 22, the plurality of actuators 24, and the plurality of vehicle instrumentation sensors 26. The plurality of actuators 24 and the plurality of vehicle instrumentation sensors 26 are both in electronic communication with one or more controllers 28 within the vehicle 12, and the one or more controllers 28 are in wireless communication with the one or more ground station controllers 20 via the network 30.

Continuing to refer to FIG. 1, the one or more field sensors 22 are installed along the predefined route 14 in positions that allow each field sensor 22 to detect a position of the vehicle 12 relative to the predefined route 14. Accordingly, the one or more ground station controllers 20 continuously monitor the position of the vehicle 12 relative to the predefined route 14 to determine if the vehicle 12 drives off the roadway that is part of the predefined route 14, and to determine if the vehicle 12 leaves the geofenced area containing the predefined route 14. In other words, the one or more ground station controllers 20 continuously monitor the one or more field sensors 22 to ensure the vehicle 12 does not depart from the roadway or leave the geofenced area that is part of the predefined route 14. Some examples of the field sensors 22 include, but are not limited to, a laser beam crossing sensor, LiDAR, and a camera. In an embodiment, the field sensors 22 are connected to one another based on a radio mesh network. For example, the one or more ground station controllers 20 may determine that the vehicle 12 has driven off the roadway that is part of the predefined route 14 by analyzing the image data collected by a camera. The field sensors 22 include antennas and circuitry for wireless communication with the one or more ground station controllers 20.

Figure 2A:
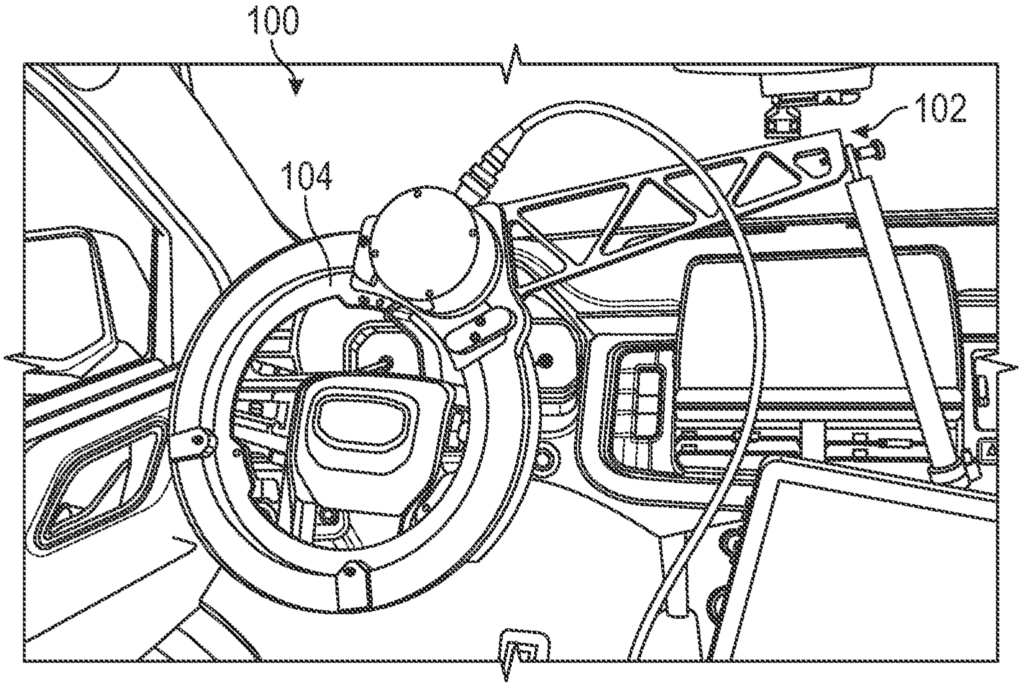
FIG. 2A illustrates a steering robot that manipulates a handwheel of the vehicle shown in FIG. 1, according to an exemplary embodiment.
Figure 2B:
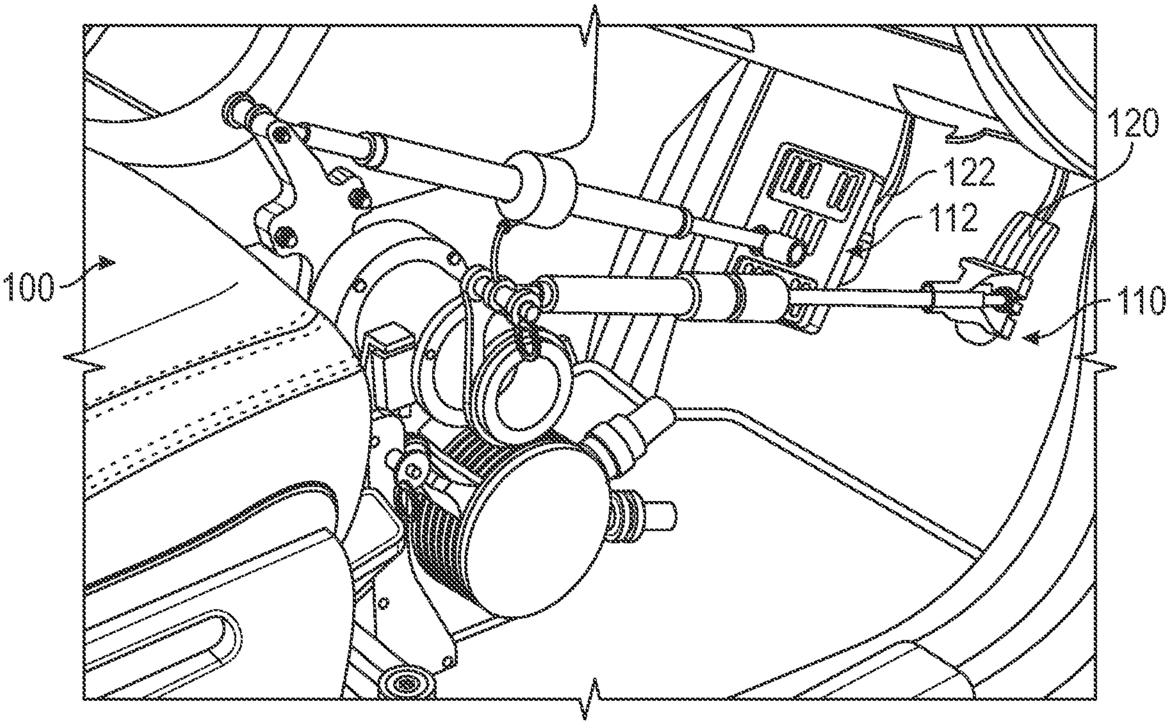
FIG. 2B illustrates two individual pedal robots of the vehicle shown in FIG. 1, according to an exemplary embodiment.

The plurality of actuators 24 includes any type of robot or actuator installed within the vehicle 12 that manipulate one or more input devices for controlling motion of the vehicle 12. The input devices represent devices that control the motion of the vehicle 12 and include, but are not limited to, handwheels, brake pedals, accelerator pedals, gear shift pedals, and paddle shifters. It is to be appreciated that the plurality of actuators 24 are responsible for manipulating all the input devices that are part of the vehicle 12. Accordingly, the vehicle 12 does not require a driver to operate the vehicle 12 around the predefined route 14. FIGS. 2A and 2B illustrate two non-limiting embodiments of the plurality of actuators 24 that are located within an interior 100 of the vehicle 12. In the example as shown in FIG. 2A, the actuator 24 is a steering robot 102 that manipulates a handwheel 104 of the vehicle 12 to change the direction of travel of the vehicle 12. In the example as shown in FIG. 2B, the actuators 24 include individual pedal robots 110 and 112. Specifically, an acceleration pedal robot 110 manipulates an acceleration pedal 120 to vary speed and a brake pedal robot 112 manipulates a brake pedal 122 to stop the vehicle 12.

Referring to FIG. 1, the plurality of vehicle instrumentation sensors 26 monitor a plurality of operating parameters of the vehicle 12. In one embodiment, plurality of operating parameters include a lateral path tracking error of the vehicle 12, a velocity tracking error of the vehicle 12, a brake temperature, a shock temperature, the load experienced by one or more steering components, the load experienced by one or more chassis components, and tire pressure. In one non-limiting embodiment, the plurality of vehicle instrumentation sensors 26 include a high-accuracy navigation system 50, a front-facing camera 52, one or more non-visual object detection sensors 54, one or more range detection sensors 56, one or more ride height sensors 58, a plurality of temperature sensors 60, one or more strain gauges 62, and one or more tire pressure sensors 64.

The high-accuracy navigation system 50 includes a positional accuracy of about one centimeter and includes systems such as, for example, a combined global navigation satellite system (GNSS) and inertial navigation system (INS) or a combined GNSS and inertial measurement unit (INS). One commercial example of a high-accuracy navigation system 50 is the combined GNSS/INS RT3000, which is available from Oxford Technical Solutions Ltd., of Middleton Stoney, England. One example of a non-visual object detection sensor 54 is LIDAR. The range detection sensors 56 may include ultrasonic sensors that measure a distance between the vehicle 12 and object that surround the vehicle 12 such as, for example, guardrails. The ride height sensors 58 may also include ultrasonic sensors that measure a distance between the ground and the vehicle 12. The plurality of temperature sensors 60 monitor a temperature of one or more components of the vehicle 12. In one non-limiting embodiment, the plurality of temperature sensors 60 monitor a temperature of the braking system and the shocks of the vehicle 12. The one or more strain gauges 62 measure a load experienced by the steering and chassis components that are part of the vehicle 12. Specifically, the strain gauges 62 may be installed on one or more shock towers, on one or more steering tie-rods, and/or on one or more chassis control arms of the vehicle 12 to measure the load experienced by the steering and chassis components. The one or more tire pressure sensors 64 monitor the tire pressure of a corresponding tire 66 that is part of the vehicle 12.

Before the vehicle 12 performs the vehicle test pattern by driving along the predefined route 14, the vehicle test pattern is first selected by an individual. Once the vehicle test pattern is selected, an individual may perform a plurality of pre-flight checks to ensure the vehicle 12 is in drivable condition and to ensure the plurality of actuators 24 and the plurality of vehicle instrumentation sensors 26 are functional and communicate with the one or more ground station controllers 20. The pre-flight checks include tasks such, but not limited to, checking tire pressure, tire wear, fuel levels, and electrical connections.

Once the flight checks are complete, the vehicle 12 may be driven along the predefined route 14 while performing the vehicle test pattern. Specifically, the one or more ground station controllers 20 instruct the plurality of actuators 24 to drive the vehicle 12 along the predefined route 14 based on the vehicle test pattern. The one or more ground station controllers 20 continuously monitor the field sensors 22 to determine the position of the vehicle 12 relative to the predefined route 14 as the vehicle 12 completes the vehicle test pattern. In response to determining the vehicle 12 has left the geofenced area that contains the predefined route 14, and the one or more ground station controllers 20 select a third alternative state of operation that the vehicle 12 follows, which is described below.

The one or more ground station controllers 20 monitor the vehicle instrumentation sensors 26 for a plurality of operating parameters of the vehicle 12. The lateral path tracking error of the vehicle 12 is determined based on Global Positioning System (GPS) coordinates collected by the high-accuracy navigation system 50 and offsets from lane markings that are collected by the front-facing camera 52, the velocity tracking error of the vehicle 12 is determined based on the GPS coordinates collected by the high-accuracy navigation system 50 and velocity measurements from one or more wheel encoders (not shown) that are part of the vehicle 12, the brake temperature and the shock temperature are monitored by the plurality of temperature sensors 60, the load experienced by the one or more steering components and the one or more chassis components are monitored by the one or more strain gauges 62, and the tire pressure is monitored by the tire pressure sensors 64. As explained below, in response to detecting one or more of the operating parameters are compromised, the one or more ground station controllers 20 select an alternative state of operation of the vehicle 12. The alternative state of operation modifies operation of the vehicle 12 accommodates the plurality of operating parameters that are compromised. In one non-limiting embodiment, four alternative states of operation exist and are selected based on the severity of the plurality of operating parameters that are compromised.

In an embodiment, the one or more ground station controllers 20 select a first alternative state of operation, where the first state of operation allows the vehicle 12 to complete a current segment of the vehicle test pattern that the vehicle 12 is currently performing first before coming to a stop. That is, in response to selecting the first alternative state of operation, the one or more ground station controllers 20 instruct the vehicle 12 to reduce speed, turn on hazard lights, and finish the current segment of the vehicle test pattern that the vehicle 12 is currently performing before instructing the vehicle 12 to park in a designated parking area. In other words, the severity of the plurality of operating parameters that are compromised indicate the vehicle 12 is permitted to operate until the current segment of the vehicle test pattern is complete. Furthermore, once the current test segment of the vehicle test pattern is complete, corrective action may be performed to allow the vehicle to resume driving along the predefined route 14 to complete the vehicle test pattern. Some examples of corrective action include, but are not limited to, cleaning one or more of the vehicle instrumentation sensors 26, reconnecting one or more of the vehicle instrumentation sensors 26, restoring lost power, and performing a visual equipment check to ensure that there is no subsequent hardware error.

In one non-limiting embodiment, the one or more ground station controllers 20 select the first alternative state of operation in response to detecting at least one of the following conditions: the lateral path tracking error exceeds a first lateral threshold value, the velocity tracking error exceeds a first velocity threshold value, an intermittent loss of wireless communication between the one or more ground station controllers 20 and the vehicle 12 lasting a first duration of time, and when one or more of the vehicle instrumentation sensors 26 are non-operational but a confidence level of data collected by the vehicle instrumentation sensors 26 is maintained. It is to be appreciated that the first lateral threshold value, the first velocity threshold value, and the first duration of time represent values that indicate a minor issue has occurred, and therefore the vehicle 12 may finish the current segment of the vehicle test pattern that the vehicle 12 is currently performing first before coming to a stop. The confidence level of the data collected by the vehicle instrumentation sensors 26 indicates that although one or more of the vehicle instrumentation sensors 26 is non-operational, there is a redundant vehicle instrumentation sensor 26 still available that collects similar data to the non-operational vehicle instrumentation sensor 26 to localize the vehicle 12. For example, if the front-facing camera 52 becomes non-operational, the high-accuracy navigation system 50 is still functional to determine the location of the vehicle 12. Moreover, the first duration in time for the intermittent loss of wireless communication between the one or more ground station controllers 20 and the vehicle 12 is selected to ensure that the vehicle 12 is unable to travel a considerable distance along the predefined route 14 without being monitored. In one embodiment, the first duration in time is equal to about one second.

It is to be appreciated that the first lateral path tracking error exceeds the first lateral threshold value and the first velocity tracking error exceeds the first velocity threshold value for a minimum amount of time, where the minimum amount of time ensures that the first lateral threshold value and the first velocity threshold value are not created by a random spike in error. For example, in one embodiment, the minimum amount of time is about 0.1 seconds, which ensures that there is persistency in error. It is also to be appreciated that the minimum amount of time applies to the second and third lateral threshold values as well as the second and third velocity tracking errors as well, which are described below.

A second alternative state of operation instructs the vehicle 12 to pull over to a shoulder of the roadway of the predefined route 14 and send applicable diagnostic codes over the network 30 to the one or more ground station controllers 20. If applicable, the vehicle 12 may also perform a lane change first before pulling over to the shoulder. That is, in response to selecting the second alternative state of operation, the one or more ground station controllers 20 instruct the vehicle 12 to stop traveling as soon as possible and pull over to the shoulder of the roadway. It is to be appreciated that the second alternative state of operation indicates an issue that is more severe than the first alternative state of operation, however, the issue is not severe enough to warrant stopping the vehicle 12 immediately.

In one non-limiting embodiment, the one or more ground station controllers 20 select the second alternative state of operation in response to detecting at least one of the following conditions: the lateral path tracking error exceeds a second lateral threshold value, the velocity tracking error exceeds a second velocity threshold value, an intermittent loss of wireless communication between the one or more ground station controllers 20 and the vehicle 12 lasting a second duration of time, a vehicle diagnostic signal indicating the vehicle 12 is to stop at the earliest possibility, a signal from one or more of the actuators 24 indicating the vehicle 12 is to stop at the earliest possibility, and when one or more of the vehicle instrumentation sensors 26 are non-operational but a minimum number of vehicle instrumentation sensors 26 is maintained. It is to be appreciated that the second lateral threshold value is greater than the first lateral threshold value, the second velocity threshold value is greater than the first velocity threshold value, and the second duration of time is greater than the first duration of time. In one example, the first duration in time is about half a second and the second duration in time is about one second. Moreover, the second lateral threshold value, the second velocity threshold value, and the second duration of time represent values that indicate an issue that requires the vehicle 12 to pull over to the shoulder of the roadway has occurred. The vehicle diagnostic signal is generated by an on-board diagnostic system (not shown) that is part of the vehicle 12. The minimum number of instrumentation sensors indicate that although two or more vehicle instrumentation sensors 26 are non-operational, it is still possible to localize the vehicle 12.

A third alternative state of operation instructs the vehicle 12 to perform an emergency stop within a current lane of travel and send applicable diagnostic codes over the network 30 to the one or more ground station controllers 20. It is to be appreciated that the third alternative state of operation indicates an issue that requires the vehicle 12 to stop immediately within the current lane of travel. In other words, the severity of the plurality of operating parameters that are compromised to a degree that requires the vehicle 12 to be stopped immediately.

In one non-limiting embodiment, the one or more ground station controllers 20 select the third alternative state of operation in response to detecting at least one of the following conditions: the lateral path tracking error exceeds a third lateral threshold value, the velocity tracking error exceeds a third velocity threshold value, an intermittent loss of wireless communication between the one or more ground station controllers 20 and the vehicle 12 lasting a third duration of time, a vehicle diagnostic signal indicating the vehicle 12 is to stop immediately, a signal from one or more of the actuators 24 indicating the vehicle 12 is to stop immediately, more than one vehicle instrumentation sensor 26 is non-operational and localization of the vehicle 12 is not possible, and when one or more of the field sensors 22 indicate the vehicle 12 has left the geofenced area that contains the predefined route 14. It is to be appreciated that the third lateral threshold value is greater than the second lateral threshold value, the third velocity threshold value is greater than the second velocity threshold value, and the third duration of time is greater than the second duration of time. In one example, the first duration of time is about half a second, the second duration of time is about one second, and the third duration in time is about 1.6 seconds. Moreover, the third lateral threshold value, the third velocity threshold value, and the third duration of time represent values that indicate an issue that requires the vehicle 12 to stop immediately within the current lane of travel.

The fourth alternative state of travel instructs the vehicle 12 to perform a task change to address one or more vehicle components that are experiencing abnormalities. Specifically, the fourth alternative state of travel addresses the brakes or the shocks of the vehicle 12 overheating, that the tire pressure is not within standard operating range, and when the load experienced by the steering or the chassis components that are part of the vehicle 12 exceeds a predefined threshold load value. The predefined threshold load value is selected to ensure that the steering components and the chassis components do not fracture or otherwise break during operation. The task change may include completing driving along a relatively flat portion of the test track to allow for the brakes, the shocks, or both to cool down. In the event the tire pressure is not within the standard operating range, the task change includes introducing tire pressure at a designated area. In the event the load experienced by the steering or the chassis components exceeds the predefined threshold load value, the task change includes terminating the vehicle test pattern and inspecting the vehicle 12. In an embodiment, the steering or the chassis components are modified.

In one non-limiting embodiment, the one or more ground station controllers 20 select the fourth alternative state of operation in response to detecting at least one of the following conditions: the brakes or the shocks of the vehicle 12 exceed a threshold operating temperature, the tire pressure falls outside the standard operating range, and the load experienced by the steering or the chassis components that are part of the vehicle exceeds the predefined threshold load value. The threshold operating temperature represents a maximum operating temperature that the brake or the shocks of the vehicle 12 may withstand.

Figure 3:
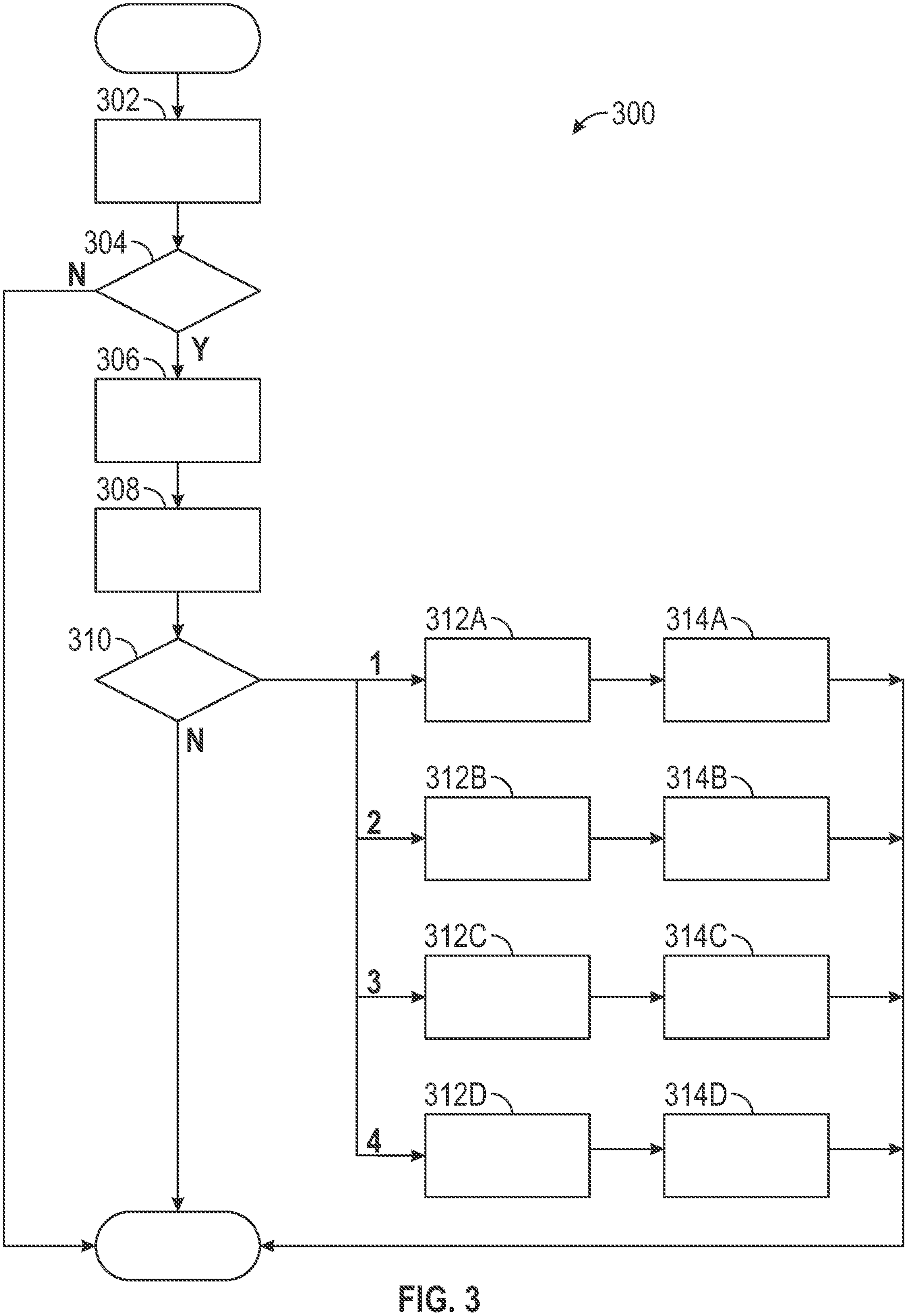
FIG. 3 is a process flow diagram illustrating a method for testing the vehicle by the driverless testing system, according to an exemplary embodiment.

FIG. 3 is an exemplary process flow diagram illustrating a method 300 for testing the vehicle 12 by the driverless testing system 10. Referring to FIGS. 1 and 3, the method 300 may begin at block 302. In block 302, an individual selects a vehicle test pattern for the vehicle 12 to follow when driving around the predefined route 14. The method 300 may then proceed to decision block 304.

In decision block 304, the individual may then complete a plurality of pre-flight checks to ensure the vehicle 12 is in drivable condition and to ensure the plurality of actuators 24 and the plurality of vehicle instrumentation sensors 26 are functional and communicate with the one or more ground station controllers 20. In response to determining the pre-flight checks pass inspection, the method 300 may proceed to block 306, otherwise the method 300 may terminate.

In block 306, the one or more ground station controllers 20 instruct the plurality of actuators 24 to drive the vehicle 12 along the predefined route 14 based on a vehicle test pattern. The method 300 may then proceed to block 308.

In block 308, the one or more ground station controllers 20 monitor the plurality of vehicle instrumentation sensors 26 for the plurality of operating parameters of the vehicle 12. The method 300 may then proceed to decision block 310.

In decision block 310, the one or more ground station controllers 20 detect if one or more of the operating parameters are compromised. If none of the operating parameters are compromised, then the method 300 may terminate.

In response to detecting one or more of the operating parameters of the vehicle are compromised, the method proceeds to one of blocks 312A, 312B, 312C, or 312D, where the one or more ground station controllers 20 select an alternative state of operation of the vehicle 12. As mentioned above, the alternative state of operation is selected based on the severity of the plurality of operating parameters that are compromised. Specifically, in response to detecting one or more of the operating parameters of the vehicle 12 associated with the first alternative state of operation of the vehicle 12, the method proceeds to block 312A, where the vehicle 12 completes a current segment of the vehicle test pattern that the vehicle 12 is currently performing first before coming to a stop. The method 300 may then proceed to block 314A, where corrective action may be performed to allow the vehicle 12 to resume driving along the predefined route 14 to complete the vehicle test pattern. The method 300 may then terminate.

In response to detecting one or more of the operating parameters of the vehicle 12 associated with the second alternative state of operation of the vehicle 12, the method proceeds to block 312B, and the one or more ground station controllers 20 instruct the vehicle 12 to pull over to a shoulder of the roadway of the predefined route 14. The method 300 may then proceed to block 314B, where the vehicle 12 may undergo recovery. The recovery depends upon the specific condition that is detected. In embodiments, the recovery includes performing necessary repair and resuming testing. In another embodiment, the recovery may include manually removing the vehicle 12 from the predefined route 14 for inspection and repair. The method 300 may then terminate.

In response to detecting one or more of the operating parameters of the vehicle 12 associated with the third alternative state of operation of the vehicle 12, the method proceeds to block 312C, and the one or more ground station controllers 20 select the third alternative state of operation that instructs the vehicle 12 to perform an emergency stop within a current lane of travel. The method 300 may then proceed to block 314C, where the vehicle 12 may undergo recovery, where the vehicle 12 is removed from the predefined route 14 for inspection and repair. The method 300 may then terminate.

In response to detecting one or more of the operating parameters of the vehicle 12 associated with the fourth alternative state of operation of the vehicle 12, the method proceeds to block 312D, and the one or more ground station controllers 20 select the fourth alternative state of operation that instructs the vehicle 12 to that instructs the vehicle 12 to perform a task change to address vehicle components that are experiencing abnormalities. The method 300 may then proceed to block 314D, where one or more task changes are performed. As mentioned above, the task change may include completing driving along a relatively flat portion of the test track to allow for the brakes, the shocks, or both to cool down, to address the tire pressure, or reducing the load of the vehicle 12. The method 300 may then terminate.

Referring generally to the figures, the disclosed driverless testing system provides various technical effects and benefits. Specifically, the driverless testing system provides an approach for extending the time a test schedule may be performed by a vehicle, without the need for an operator to drive the vehicle. It is to be appreciated that durability testing includes exaggerated vertical loads that produce the effects of multiple years of use within an abbreviated timeframe. The disclosed driverless testing system eliminates the occurrence of physical and mental fatigue in drivers, which may be especially significant when relatively long durability tests are involved. The driverless testing system may also result in reduced validation time, as well as improved accuracy, repeatability, and productivity.

The controllers may refer to, or be part of an electronic circuit, a combinational logic circuit, a field programmable gate array (FPGA), a some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A driverless testing system for a vehicle driven along a predefined route situated in a location remote from a ground station control station, wherein the driverless testing system comprises:

one or more ground station controllers located at the ground station control station that are in wireless communication with a plurality of actuators and a plurality of vehicle instrumentation sensors by a network, wherein the plurality of vehicle instrumentation sensors are installed within the vehicle and the plurality of actuators are installed within and control motion of the vehicle, wherein the plurality of actuators include a robot or actuator that manipulates one or more input devices that are part of the vehicle for controlling motion of the vehicle, and wherein the vehicle does not require a driver to operate the vehicle around the predefined route, and wherein the one or more ground station controllers execute instructions to:

instruct the plurality of actuators drive the vehicle along the predefined route based on a vehicle test pattern;

monitor the plurality of vehicle instrumentation sensors for a plurality of operating parameters of the vehicle;

in response to detecting one or more of the operating parameters of the vehicle are compromised, select an alternative state of operation of the vehicle based on a severity of the plurality of operating parameters that are compromised; and instruct the plurality of actuators to drive the vehicle along the predefined route based on the vehicle test pattern.

2. The driverless testing system of claim 1, wherein the one or more ground station controllers select a first alternative state of operation that allows the vehicle to complete a current segment of the vehicle test pattern that the vehicle is currently performing first before coming to a stop.

3. The driverless testing system of claim 2, wherein the one or more ground station controllers select the first alternative state of operation in response to detecting at least one of the following:

a lateral path tracking error exceeds a first lateral threshold value, a velocity tracking error exceeds a first velocity threshold value, an intermittent loss of wireless communication between the one or more ground station controllers and the vehicle lasting a first duration of time, and when one or more of the vehicle instrumentation sensors are non-operational but a confidence level of data collected by the plurality of vehicle instrumentation sensors is maintained.

4. The driverless testing system of claim 2, wherein the one or more ground station controllers select a second alternative state of operation that instructs the vehicle to pull over to a shoulder of a roadway of the predefined route.

5. The driverless testing system of claim 4, wherein the one or more ground station controllers select the second alternative state of operation in response to detecting at least one of the following:

a lateral path tracking error exceeds a second lateral threshold value, a velocity tracking error exceeds a second velocity threshold value, an intermittent loss of wireless communication between the one or more ground station controllers and the vehicle lasting a second duration of time, a vehicle diagnostic signal indicating the vehicle is to stop at the earliest possibility, a signal from one or more of the actuators indicating the vehicle is to stop at the earliest possibility, and when one or more of the vehicle instrumentation sensors are non-operational but a minimum number of vehicle instrumentation sensors is maintained.

6. The driverless testing system of claim 4, wherein the one or more ground station controllers select a third alternative state of operation that instructs the vehicle to perform an emergency stop within a current lane of travel.

7. The driverless testing system of claim 6, wherein the one or more ground station controllers select the third alternative state of operation in response to detecting at least one of the following:

a lateral path tracking error exceeds a third lateral threshold value, a velocity tracking error exceeds a third velocity threshold value, an intermittent loss of wireless communication between the one or more ground station controllers and the vehicle lasting a third duration of time, a vehicle diagnostic signal indicating the vehicle is to stop immediately, a signal from one or more of the actuators indicating the vehicle is to stop immediately, and when more than one vehicle instrumentation sensor is non-operational and localization of the vehicle is not possible.

8. The driverless testing system of claim 7, further comprising:

one or more field sensors in wireless communication with the one or more ground station controllers, wherein the one or more field sensors are installed along the predefined route in positions that allow each field sensor to detect a position of the vehicle relative to the predefined route.

9. The driverless testing system of claim 8, wherein the one or more ground station controllers select the third alternative state of operation in response to detecting one or more of the field sensors indicating the vehicle has left a geofenced area containing the predefined route.

10. The driverless testing system of claim 6, wherein the one or more ground station controllers select a fourth alternative state of travel that instructs the vehicle to perform a task change to address one or more vehicle components that are experiencing abnormalities.

11. The driverless testing system of claim 10, wherein the one or more ground station controllers select the fourth alternative state of operation in response to detecting at least one of the following:

brakes or shocks of the vehicle exceed a threshold operating temperature, a tire pressure falls outside a standard operating range, and a load experienced by steering components or chassis components that are part of the vehicle exceed a predefined threshold load value.

12. The driverless testing system of claim 1, wherein the plurality of operating parameters includes one or more of the following: a lateral path tracking error of the vehicle, a velocity tracking error of the vehicle, a brake temperature, a shock temperature, and a load experienced by one or more chassis components.

13. The driverless testing system of claim 1, wherein the one or more ground station controllers select one of the following:

a first state of operation that allows the vehicle to complete a current segment of the vehicle test pattern that the vehicle is currently performing first before coming to a stop, a second alternative state of operation that instructs the vehicle to pull over to a shoulder of a roadway of the predefined route, a third alternative state of operation that instructs the vehicle to perform an emergency stop within a current lane of travel, or a fourth alternative state of travel that instructs the vehicle to perform a task change to address one or more vehicle components that are experiencing abnormalities.

14. A method of testing a vehicle by driverless testing system, wherein the vehicle is driven along a predefined route situated in a location remote from a ground station control station, wherein the method comprises:

instructing, by one or more ground station controllers located at the ground station control station, a plurality of actuators drive the vehicle along the predefined route based on a vehicle test pattern, wherein the plurality of actuators are installed within and control motion of the vehicle and include a robot or actuator that manipulates one or more input devices that are part of the vehicle for controlling motion of the vehicle, and wherein the vehicle does not require a driver to operate the vehicle around the predefined route;

monitoring, by the one or more ground station controllers, a plurality of vehicle instrumentation sensors for a plurality of operating parameters of the vehicle;

in response to detecting one or more of the plurality of operating parameters of the vehicle are compromised, selecting, by the one or more ground station controllers, an alternative state of operation of the vehicle, wherein the alternative state of operation is selected based on a severity of the plurality of operating parameters that are compromised; and instruct the plurality of actuators to drive the vehicle along the predefined route based on the vehicle test pattern.

15. A driverless testing system for a vehicle driven along a predefined route situated in a location remote from a ground station control station, wherein the driverless testing system comprises:

one or more ground station controllers located at the ground station control station, wherein the one or more ground station controllers are in wireless communication with a plurality of actuators and a plurality of vehicle instrumentation sensors by a network, and wherein the plurality of vehicle instrumentation sensors are installed within the vehicle and the plurality of actuators are installed within and control motion of the vehicle, wherein the plurality of actuators include a robot or actuator that manipulates one or more input devices that are part of the vehicle for controlling motion of the vehicle, and wherein the vehicle does not require a driver to operate the vehicle around the predefined route, and wherein the one or more ground station controllers execute instructions to:

instruct the plurality of actuators drive the vehicle along the predefined route based on a vehicle test pattern;

monitor the plurality of vehicle instrumentation sensors for a plurality of operating parameters of the vehicle;

in response to detecting one or more of the operating parameters of the vehicle are compromised, select an alternative state of operation of the vehicle based on a severity of the plurality of operating parameters that are compromised, wherein a first alternative state of operation allows the vehicle to complete a current segment of the vehicle test pattern that the vehicle is currently performing first before coming to a stop, a second alternative state of operation instructs the vehicle to pull over to a shoulder of a roadway of the predefined route, a third alternative state of operation instructs the vehicle to perform an emergency stop within a current lane of travel, and a fourth alternative state of travel instructs the vehicle to perform a task change to address one or more vehicle components that are experiencing abnormalities; and instruct the plurality of actuators to drive the vehicle along the predefined route based on the vehicle test pattern.

16. The driverless testing system of claim 15, wherein the one or more ground station controllers select the first alternative state of operation in response to detecting at least one of the following:

a lateral path tracking error exceeds a first lateral threshold value, a velocity tracking error exceeds a first velocity threshold value, an intermittent loss of wireless communication between the one or more ground station controllers and the vehicle lasting a first duration of time, and when one or more of the vehicle instrumentation sensors are non-operational but a confidence level of data collected by the plurality of vehicle instrumentation sensors is maintained.

17. The driverless testing system of claim 15, wherein the one or more ground station controllers select the second alternative state of operation in response to detecting at least one of the following:

a lateral path tracking error exceeds a second lateral threshold value, a velocity tracking error exceeds a second velocity threshold value, an intermittent loss of wireless communication between the one or more ground station controllers and the vehicle lasting a second duration of time, a vehicle diagnostic signal indicating the vehicle is to stop at the earliest possibility, a signal from one or more of the actuators indicating the vehicle is to stop at the earliest possibility, and when one or more of the vehicle instrumentation sensors are non-operational but a minimum number of vehicle instrumentation sensors is maintained.

18. The driverless testing system of claim 15, wherein the one or more ground station controllers select the third alternative state of operation in response to detecting at least one of the following:

a lateral path tracking error exceeds a third lateral threshold value, a velocity tracking error exceeds a third velocity threshold value, an intermittent loss of wireless communication between the one or more ground station controllers and the vehicle lasting a third duration of time, a vehicle diagnostic signal indicating the vehicle is to stop immediately, a signal from one or more of the actuators 24 indicating the vehicle is to stop immediately, and when more than one vehicle instrumentation sensor is non-operational and localization of the vehicle is not possible.

19. The driverless testing system of claim 15, wherein the one or more ground station controllers select the fourth alternative state of operation in response to detecting at least one of the following:

brakes or shocks of the vehicle exceed a threshold operating temperature, a tire pressure falls outside a standard operating range, and a load experienced by steering components or chassis components that are part of the vehicle exceed a predefined threshold load value.

20. The driverless testing system of claim 15, wherein the plurality of operating parameters includes one or more of the following: a lateral path tracking error of the vehicle, a velocity tracking error of the vehicle, a brake temperature, a shock temperature, and a load experienced by one or more chassis components.

* * * * *